Nov. 19, 1929.　　T. H. THOMAS　　1,736,021
TRIPLE VALVE DEVICE
Filed Nov. 17, 1927
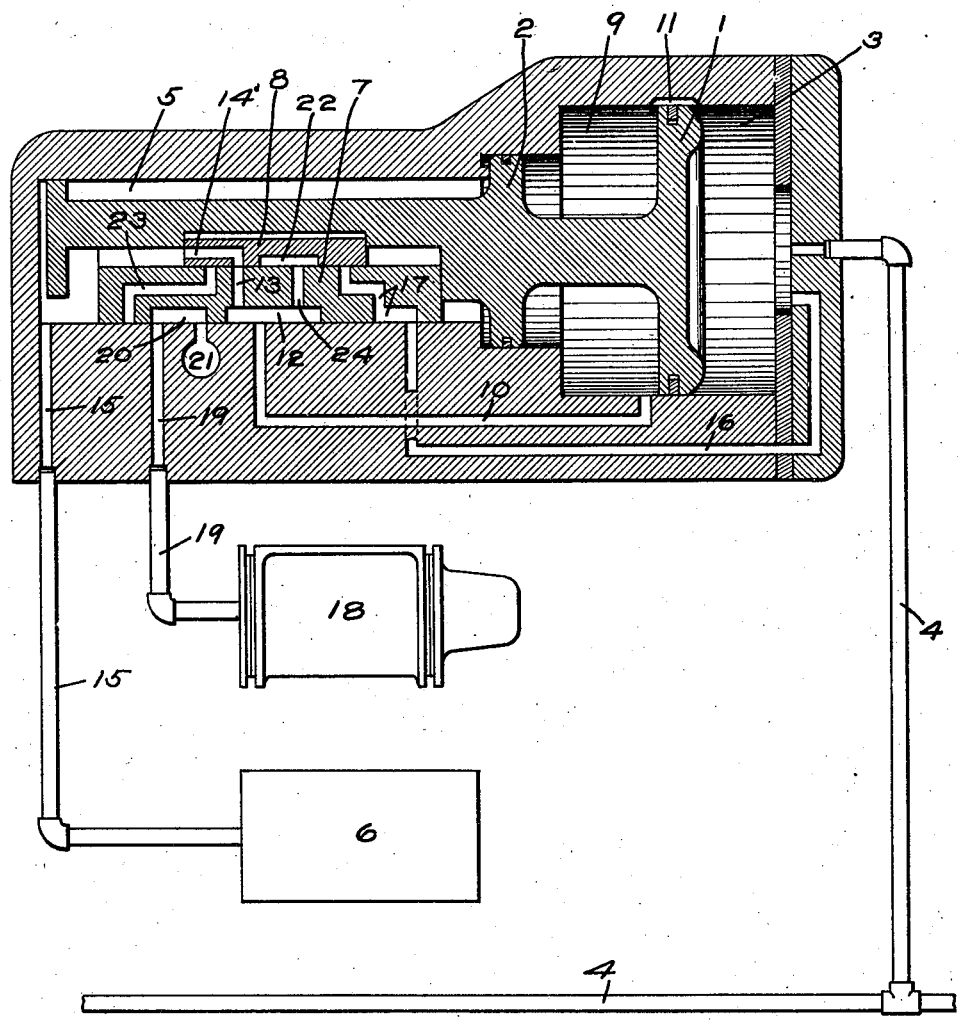
INVENTOR
THOMAS H. THOMAS.
BY Wm. M. Cady
ATTORNEY Patented Nov. 19, 1929

1,736,021

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRIPLE-VALVE DEVICE

Application filed November 17, 1927. Serial No. 233,790.

This invention relates to fluid pressure brakes and more particularly to a triple valve device.

With the use of the ordinary type of triple valve device, having a piston which is subject to certain pressure differentials between brake pipe and auxiliary reservoir, for moving the piston, together with its associated parts, to their brake application or release positions, it may occur, that after these moving parts have been shifted to their application positions, a pressure differential may be created, which may be insufficient to cause the piston to operate to shift the associated moving parts to their release positions when it is desired to effect the release of the brakes, and this failure to create a sufficient pressure differential may be due to a number of causes, some of which may be, leakage of fluid under pressure past the piston, and frictional resistance of the piston and associated moving parts. As well known, for various reasons, there is a tendency to produce a slow rate of rise in brake pipe pressure when releasing, especially toward the rear end of long trains and consequently a less differential pressure in such cases is variable for release.

An object of my invention is to provide a triple valve device in which the release movement of the moving parts may be effected with a minimum pressure differential between the brake pipe and the auxiliary reservoir.

Another object of my invention is to provide a triple valve device in which the release movement of the moving parts may be effected with a minimum pressure differential between the brake pipe and the auxiliary reservoir and in which a greater pressure differential is required to effect the brake application movement of the parts.

Other objects and advantages will appear from the following more detailed description of the drawing.

In the accompanying drawing, the single figure is a diagrammatic view of a portion of a fluid pressure brake apparatus embodying the invention, the triple valve device being shown in longitudinal section.

As shown in the accompanying drawing, the triple valve device may comprise a cylinder containing a piston 1, and a smaller cylinder containing a piston 2 which is connected, by a stem, to the piston 1, the chamber 3, at the outer face of piston 1, being connected to a brake pipe 4, and the valve chamber 5, at the outer face of the piston 2, being connected to an auxiliary reservoir 6 and containing a slide valve 7 and a graduating slide valve 8, which latter valve, as hereinafter more fully described, is movable a limited distance relative to the slide valve 7.

The chamber 9, intermediate the pistons 1 and 2, is connected to a passage 10 leading to the seat of the slide valve 7, and is adapted to be connected to the piston chamber 3, through a feed groove 11 when the piston 1 is in its normal release position, as shown in the drawing.

When the pistons and slide valves are in their normal release positions, fluid under pressure from the brake pipe 4 flows into the piston chamber 3 and past the piston 1, by way of the feed groove 11, into the piston chamber 9, and from thence to the auxiliary reservoir 6, through passage 10, cavity 12 and port 13, in the slide valve 7, port 14 in the graduating slide valve 8, valve chamber 5 and passage and pipe 15, thus charging the piston chambers 3 and 9, valve chamber 5 and auxiliary reservoir 6 with fluid at brake pipe pressure. Leading from the piston chamber 3 to the seat of the slide valve 7, is a passage 16, which connects with a cavity and port 17, in the slide valve 7, leading to the graduating slide valve seat, the graduating slide valve, in its normal release position, lapping the port 17. The usual brake cylinder 18 is normally vented to the atmosphere, through pipe and passage 19, cavity 20, in the slide valve 7, and atmospheric passage 21.

When the triple valve device is in release position, piston chamber 9 is supplied with fluid at auxiliary reservoir pressure, and the piston 2 being subject to auxiliary reservoir pressure at its inner face, the piston 2 is balanced as to fluid pressures, and the piston area subject to auxiliary reservoir pressure is that of the large piston 1, consequently, in effecting an application of the brakes, the pressure in the brake pipe and in piston chamber 3 being reduced in the usual manner, the initial differential is effective on the piston 2 and on the inner face of the piston 1 and causes the pistons 1 and 2 to shift toward the right to initially operate the graduating slide valve 8, relative to the slide valve 7. As the piston 1 is thus shifted, it will pass beyond the feed groove 11 and will prevent the flow of fluid therethrough from the piston chamber 9 to the piston chamber 3, and as the graduating slide valve 8 moves in this direction, relative to the slide valve 7, the port 13 will be lapped, thus cutting off communication between the chambers 5 and 9. The graduating slide valve 8, as it is thus moved, connects a port 24 leading from the cavity 12 in the slide valve 7, to the graduating slide valve seat, through a cavity 22 in the graduating slide valve 8, thus connecting the piston chambers 3 and 9 to cause the pressures on the opposite sides of the piston 1 to equalize. The relative movement of the graduating slide valve 8 having been thus taken up, and brake pipe pressure having equalized into piston chamber 9, the piston 1 is rendered ineffective and further movement of the parts is responsive to the pressure differential acting on the small piston 2. When the slide valve 7 has been thus moved to its brake application position, fluid under pressure from the auxiliary reservoir and valve chamber 5 will be supplied to the brake cylinder 18, through a port 23 in the slide valve 7, which was uncovered during the initial movement of the graduating slide valve 8, and through passage and pipe 19.

In effecting the release of the brakes, fluid under pressure is caused to again flow from the brake pipe 4 into the piston chamber 3, and when the pressure of fluid, acting upon the outer face of the large piston 1, is sufficient to overcome the pressure of fluid acting upon the inner face of the small piston 2, the pistons 1 and 2 and graduating slide valve 8 will be shifted toward their release positions. As the graduating slide valve 8 is thus initially moved, relative to the slide valve 7, the port 17, of the slide valve 7, is lapped, thus cutting off communication between the piston chambers 3 and 9, and uncovers the port 13, and thus again establishing communication of the chamber 9 with the valve chamber 5 and auxiliary reservoir 6, through passage 10, cavity 12, in the slide valve 7, and port 14 in the graduating slide valve 8, and causing the pressures on the opposite sides of the small piston 2 to equalize. The relative movement of the graduating slide valve 8 having been thus taken up, and auxiliary reservoir pressure having equalized into piston chamber 9, the piston 2 is rendered ineffective and further movement of the parts is responsive to the pressure differential acting on the large piston 1. When the slide valve 7 has been thus moved to its release position, as shown in the drawing, the brake cylinder is vented to the atmosphere and the auxiliary reservoir 6 is charged as hereinbefore described.

From the foregoing description it will be seen that, in effecting an application of the brakes, the pressure differential between brake pipe and auxiliary reservoir is effective on the small piston 2 and that, in effecting the release of the brakes, the pressure differential between brake pipe and auxiliary reservoir is effective on the piston 1, and as the area of this latter piston is greater than that of the former, the pressure differential required to shift the parts to their release positions is considerably less than that required to shift them to their application positions, thus ensuring the more positive and prompt operation of the parts to their brake releasing positions and thereby reducing, to a minimum, the possibilities of the brakes sticking.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, an auxiliary reservoir, and a valve device comprising piston means subject to the opposing pressures of the auxiliary reservoir and brake pipe and valve means operated by said piston means for controlling the application and release of the brakes, of means for rendering said piston means more sensitive to variations in fluid pressure in releasing than in applying the brakes.

2. In a fluid pressure brake, the combination with a brake pipe, an auxiliary reservoir, and a valve device comprising piston means subject to the opposing pressures of the auxiliary reservoir and brake pipe and valve means operated by said piston means for controlling the application and release of the brakes, of means for subjecting a larger area of said piston means to the opposing pressures of the brake pipe and auxiliary reservoir in releasing the brakes than in applying the brakes.

3. In a fluid pressure brake, the combination with a brake pipe and an auxiliary reservoir, of a valve device having piston means subject to the opposing pressures of the brake pipe and auxiliary reservoir for controlling the application and release of the brakes, and means for rendering said piston means operative at a lesser pressure differential in releasing than in applying the brakes.

4. In a fluid pressure brake, the combination with a brake pipe and an auxiliary reservoir, of valve means for controlling the application and release of the brakes, piston means comprising differential piston heads for operating said valve means and having the larger piston head subject on one side to brake pipe pressure and the smaller piston head to auxiliary reservoir pressure and means for supplying fluid at brake pipe pressure to the chamber intermediate said heads in applying the brakes and fluid at auxiliary reservoir pressure in releasing the brakes.

5. The combination with a brake pipe and auxiliary reservoir, of a triple valve device comprising a main valve, a graduating valve having a movement relative to the main valve, piston means for operating said valves having differential piston heads, the smaller head being subject to auxiliary reservoir pressure and the larger head to brake pipe pressure, the chamber intermediate said heads being supplied with fluid at brake pipe pressure upon relative movement of the graduating valve in applying the brakes and with fluid at auxiliary reservoir pressure upon relative movement of the graduating valve in releasing the brakes.

6. A triple valve device for fluid pressure brake systems, comprising means operative by fluid under pressure to control the application and release of the brakes, said means being more sensitive to variations in fluid pressure in releasing than in applying the brakes.

7. A triple valve device for fluid pressure brakes, comprising piston means subject to opposing fluid pressures for controlling the application and release of the brakes, and means for rendering said piston means operative at a lesser pressure differential in releasing than in applying the brakes.

8. In a fluid pressure brake, the combination with a brake pipe and an auxiliary reservoir, of a valve device for controlling the application and the release of the brakes and having differential piston heads, and means operative upon a reduction in brake pipe pressure for subjecting the smaller of said piston heads to a pressure differential between auxiliary reservoir and brake pipe for effecting an application of the brakes, and operative upon an increase in brake pipe pressure for subjecting the larger of said piston heads to a lesser differential to effect a release of the brakes.

9. In a fluid pressure brake, the combination with a brake pipe and an auxiliary reservoir, of a valve device for controlling the application and the release of the brakes and having differential piston heads, and slide valve means operative upon a reduction in brake pipe pressure for subjecting the smaller of said piston heads to a pressure differential between auxiliary reservoir and brake pipe for effecting an application of the brakes, and operative upon an increase in brake pipe pressure for subjecting the larger of said piston heads to a lesser differential to effect a release of the brakes.

10. In a fluid pressure brake, the combination with a brake pipe and an auxiliary reservoir, of a valve device for controlling the application and the release of the brakes and having differential piston heads, and a plurality of cooperating slide valves operative upon a reduction in brake pipe pressure for subjecting the smaller of said piston heads to a pressure differential between auxiliary reservoir and brake pipe for effecting an application of the brakes, and operative upon an increase in brake pipe pressure for subjecting the larger of said piston heads to a lesser differential to effect a release of the brakes.

11. In a fluid pressure brake, the combination with a brake pipe, an auxiliary reservoir, and a valve device comprising piston means subject to the opposing pressures of the auxiliary reservoir and brake pipe and valve means operated by said piston means for controlling the application and release of the brakes, of valve means for subjecting a larger area of said piston means to the opposing pressures of the brake pipe and auxiliary reservoir in releasing the brakes than in applying the brakes.

12. In a fluid pressure brake, the combination with a brake pipe, an auxiliary reservoir, and a valve device comprising piston means subject to the opposing pressures of the auxiliary reservoir and brake pipe and valve means operated by said piston means for controlling the application and release of the brakes, of a plurality of cooperating slide valves for subjecting a larger area of said piston means to the opposing pressures of the brake pipe and auxiliary reservoir in releasing the brakes than in applying the brakes.

13. In a fluid pressure brake, the combination with a brake pipe, of a triple valve device comprising a casing having two piston chambers and a valve chamber normally connected and charged with fluid under pressure from said brake pipe, differential pistons in said chambers, and valve means in said valve chamber operative upon the effecting of a reduction in brake pipe pressure to close communication of said valve chamber with said piston chambers to create a pressure differential effective on the small piston to apply the brakes, said valve means being operative upon an increase in brake pipe pressure to open communication between one of said piston chambers and said valve chamber to create a lesser pressure differential effective on the larger piston to release the brakes.

14. In a fluid pressure brake, the combination with a brake pipe, of a reservoir normally charged with fluid under pressure, a brake cylinder and a valve device operative upon a reduction in brake pipe pressure for controlling the supply of fluid from said reservoir to said brake cylinder to effect an application of the brakes and operative upon an increase in brake pipe pressure for venting said brake cylinder to the atmosphere to effect a release of the brakes, said device comprising piston means operative at a lesser fluid pressure differential in releasing than in applying the brakes.

In testimony whereof I have hereunto set my hand.

THOMAS H. THOMAS.